Nov. 22, 1932.  J. RAH  1,888,241
INSULATING JOINT
Filed May 31, 1928  2 Sheets-Sheet 2
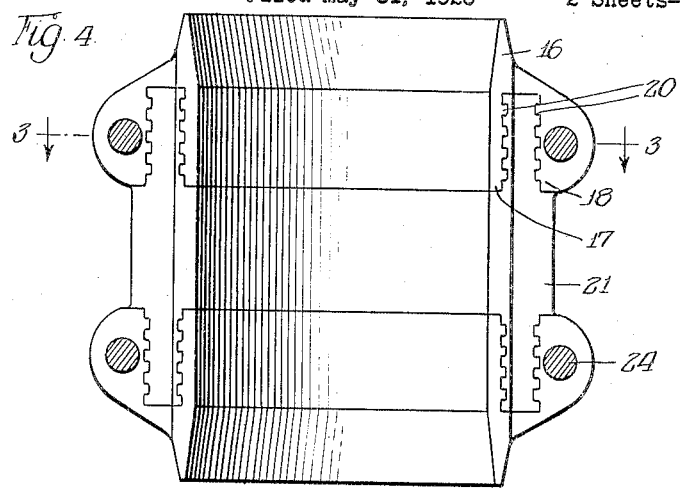
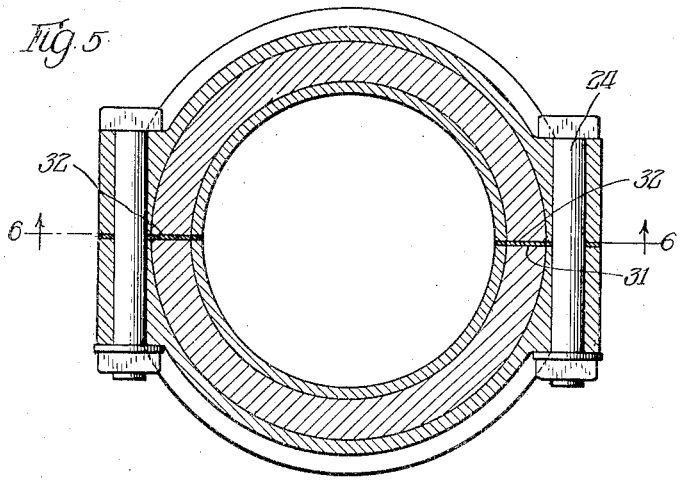
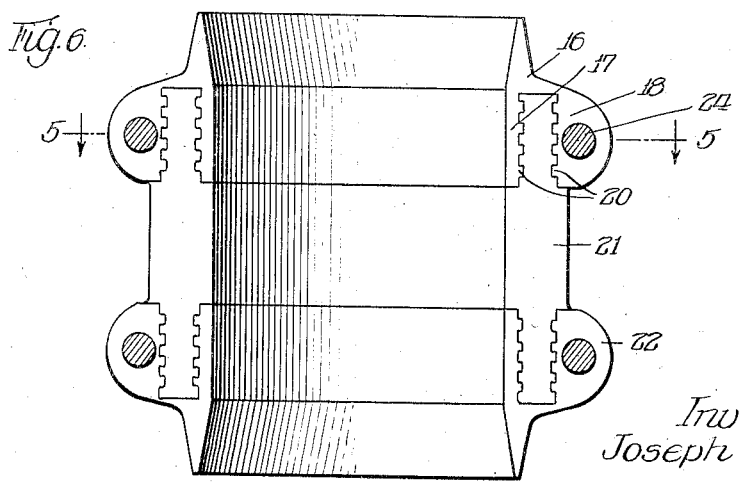
Inventor:
Joseph Rah, Patented Nov. 22, 1932

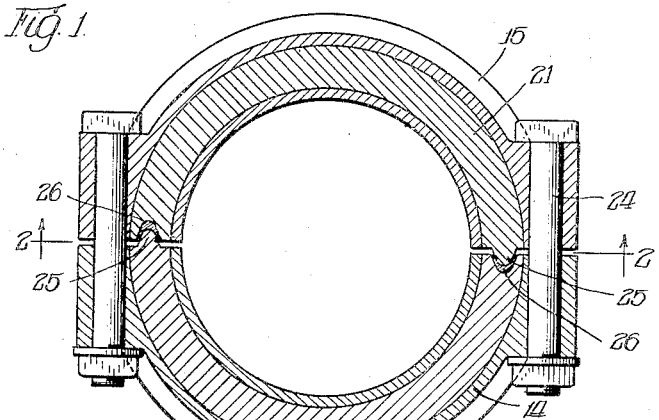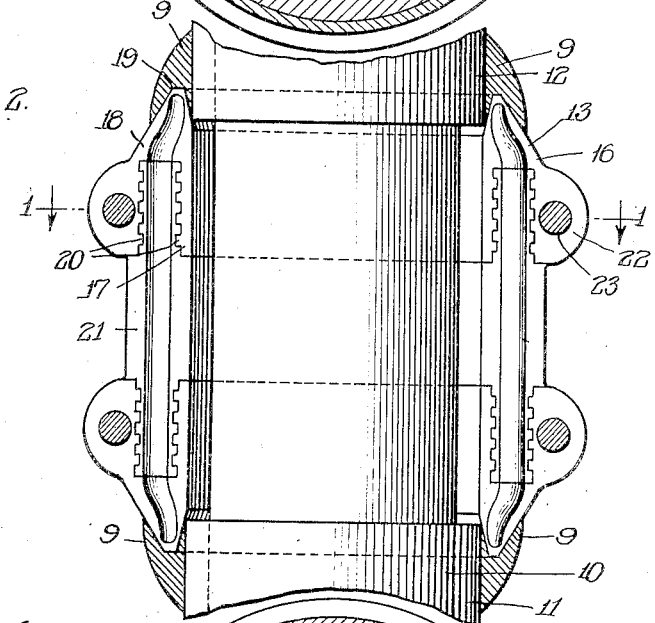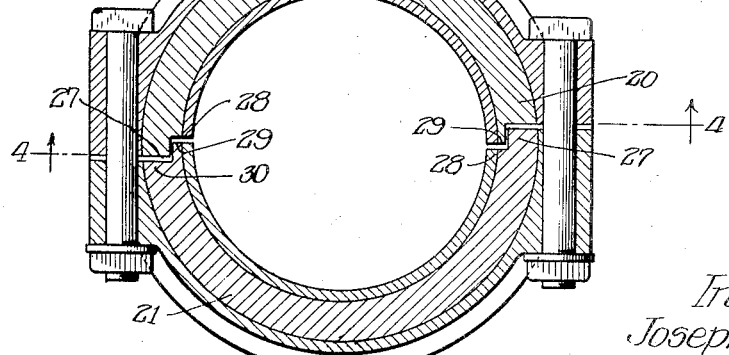

1,888,241

UNITED STATES PATENT OFFICE

JOSEPH RAH, OF CHICAGO, ILLINOIS, ASSIGNOR TO G. & W. ELECTRIC SPECIALTY COMPANY, OF CHICAGO, ILLINOIS, A CORPORATION OF ILLINOIS

INSULATING JOINT

Application filed May 31, 1928. Serial No. 281,760.

The invention pertains to insulating joints, and more particularly to insulating sleeves adapted to form connections between spaced ends of the sheathing of electric power cables or the like.

In the operation of underground cables, especially those carrying high tension currents, it is necessary to interrupt the electrical conductivity of the lead sheathing at suitable intervals by means of insulating joints to prevent the building up of excessive induced voltage in said sheath. This is particularly true where the line comprises individual or single conductor cables, as for example, a plurality of single conductor capable of successfully insulating cable sec- the sheath of each individual conductor tends to develop an E. M. F. per unit of length which depends primarily upon the current carried in the conductor. In a run of cable of considerable length, where the sheath is not interrupted, the cumulative E. M. F. may rise to a considerable value. If then the several cables of the multiphase line have their lead sheaths connected at one point, a current will flow, resulting in heat losses, and if these heat losses can be eliminated, it has been found that the carrying capacity of the cable can be increased materially.

It has heretofore been proposed to interrupt the conductivity of the sheath by the insertion of insulating sections or joints. Owing to the fact that these joints have to be applied in manholes or other constricted working areas, it is important that the joints be of such character that they can be completed in the factory and shipped as a unit or as a convenient part thereof to the point of installation. It will be appreciated that the problem of making a satisfactory joint is further complicated when used for oil filled cables due to the fact that in addition to insulating the sections of the sheath from each other, the parts must be fluid tight under all conditions, and further, the joint must be strong enough to withstand the electrical and mechanical loads that may be disposed thereon without yielding or leaking.

It is therefore an object of this invention to provide a continuation of the sheathing effect of lead encased cables.

Another object is to provide a device for interrupting the current flow in the cable sheathing so that there will be no loss of power due to unnecessary heating in the cable.

Still another object is to provide a device made up of a plurality of similar parts readily interchangeable and which may be installed under any service conditions.

A further object is to provide an insulating joint which is of simple construction, is capable of successfully insulating cable sections, withstanding substantial fluid pressure without leaking, and fulfills all requirements of service and manufacture.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a cross section of one form of insulating joint assembly, the same being taken substantially in the plane as indicated by the line 1—1 of Figure 2;

Figure 2 is a longitudinal plan of the form of insulating joint illustrated in Figure 1, the same being taken substantially in the plane as indicated by the line 2—2 of Figure 1;

Figure 3 is a cross section of a modified form of insulating joint assembly, the same being taken substantially in the plane as indicated by the line 3—3 of Figure 4;

Figure 4 is a longitudinal plan of the form of insulating joint illustrated in Figure 3, the same being taken substantially in the plane as indicated by the line 4—4 of Figure 3;

Figure 5 is a cross section of another modified form of insulating joint assembly, the same being taken substantially in the plane as indicated by the line 5—5 of Figure 6; and Figure 6 is a longitudinal plan of the form of insulating joint illustrated in Figure 5, the same being taken substantially in the plane as indicated by the line 6—6 of Figure 5.

Referring first of all to the modification illustrated in Figures 1 and 2, the cable 10 is provided with sheathing interrupted to provide portions 11 and 12 thereof spaced apart, as clearly shown in Figure 2. The sheathing is adapted to be bridged by the insulating joint 13, the ends thereof being wiped as at 9 to the portions 11 and 12 of the sheathing. Said joint in the form illustrated includes two similar parts 14 and 15 adapted to bridge the interruption in the sheathing and to be fastened therearound. Each section includes sheathing engaging metallic sleeve portions 16 (of brass or other suitable material) having inner and outer spaced portions 17 and 18 joined together adjacent their ends 19, the spaced portions being provided with facing ribs 20 forming anchoring means for insulation 21 (of artificial resin or other suitable material) joining pairs of the joint members. Each joint member on the outside thereof is provided with lugs 22 having apertures 23 disposed therein and adapted to be aligned with corresponding apertures in adjacent sections and adapted to receive securing means, such as the nuts and bolts 24, for securing the assembly in operative position with respect to the cable 10. In this form, both the metallic sleeve members and the insulation are provided with a depending lug or ridge 25 and a corresponding depression 26 on the opposite side adapted to interfit with the adjacent ridge 25, the portion of the ridge and depression in this sleeve being slightly curved and extending adjacent the end thereof. So it will be seen that in the assembling of the joint, it is only necessary to dispose ridges within depressions and to tighten the nut and bolt connections 24.

The construction illustrated in Figures 3 and 4 includes substantially the same parts; that is, the metallic sheath or sleeve members 16 are provided with the spaced portions 17 and 18, each being provided with the ridges 20 adapted to secure the insulation 21 between pairs of said sheath members, the outer portions 18 being provided with the lugs 22 for the reception of the nut and bolt connections 24 to thereby maintain the parts in operative assembled position. This device differs, however, from the device illustrated in Figure 1 in that in place of the ridges 25 and depressions 26, both the insulation and the metallic sheath members are provided with stepped portions 27 and 28 corresponding to oppositely disposed sheath portions 29 and 30, so that in assemblage, as clearly shown in Figure 3, the parts will interfit when the joint is in operative position.

Referring now more particularly to Figures 5 and 6, as before, the members include metallic sheath members 16 provided with spaced portions 17 and 18, each having ridges 20 adapted to receive the insulation 21 disposed between said sheath members, the outer portions 18 being provided with lugs 22 adapted to receive the bolts 24 in the assemblage thereof. In this case, each section merely has flat abutting portions 31, each half of the joint being of exactly the same characteristics.

In each joint it may be found desirable to interpose gaskets between the parts of the assembly, such as at 32 (Figure 5), though such in many instances may not be necessary or desirable. Also, spaced split rings of any desired number may be molded in the insulation to prevent the concentration of stresses at the edges of the sleeve members 14 and 15, all as clearly set forth in co-pending application Serial No. 195,359, filed May 31, 1927, Patent No. 1,784,881 dated Dec. 16, 1930, for insulating joint.

It is to be understood that I do not wish to be limited by the exact embodiment of the device shown, which is merely by way of illustration and not limitation, as various and other forms of the device will of course be apparent to those skilled in the art without departure from the spirit of the invention or the scope of the claims.

I claim:

1. A connection comprising, the combination of a plurality of similar members, each member including spaced sleeve members, a recess in each of said sleeve members and insulating means disposed between said sleeve members and extending into the recesses thereof, said sleeve members having interfitting parts, and means on each member for securing said members in operative relation.

2. A connection comprising, the combination of a plurality of similar members, each member including spaced sleeve members, a recess in each of said sleeve members and insulating means disposed between said sleeve members and extending into the recesses thereof, said insulating means having interfitting parts, and means on each member for securing said members in operative relation.

3. A connection comprising, the combination of a plurality of similar members, each member including a pair of spaced sleeve members, a recess in each of said sleeve members, having facing grooves formed therein, insulating means disposed between said sleeve members and extending into the recesses thereof for connecting the same, said sleeve members and insulating means having interfitting parts, and means on the exterior of each member for securing said members in operative relation.

Signed at Chicago, Illinois, this 28 day of May, 1928.

JOSEPH RAH.

CERTIFICATE OF CORRECTION.

Patent No. 1,888,241.   November 22, 1932.

JOSEPH RAH.

It is hereby certified that error appears in the printed specification of the above numbered patent requiring correction as follows: Page 1, line 16, strike out the words "capable of successfully insulating cable sec-" and insert instead "cables in a multi-phase underground line, as"; and that the said Letters Patent should be read with this correction therein that the same may conform to the record of the case in the Patent Office.

Signed and sealed this 17th day of January, A. D. 1933.

(Seal)

M. J. Moore,
Acting Commissioner of Patents.